Sept. 15, 1959     M. COOPER     2,903,944
REMOTE CONTROL REAR VIEW MIRROR
Filed Jan. 31, 1958
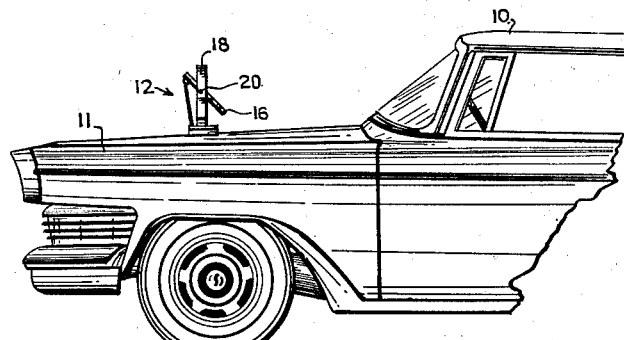
Fig. 1.
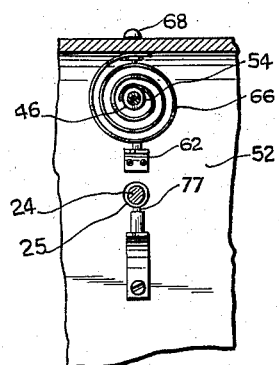
Fig. 6.
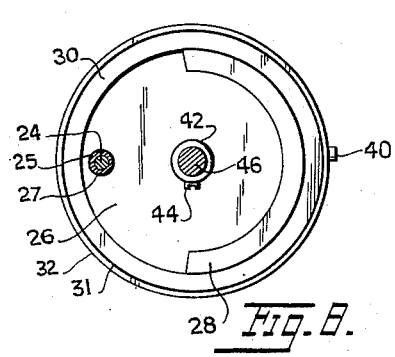
Fig. 8.
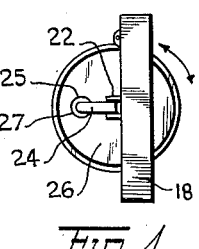
Fig. 4.
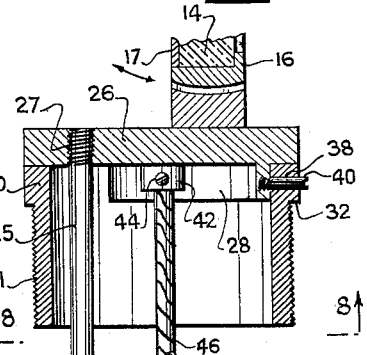
Fig. 7.
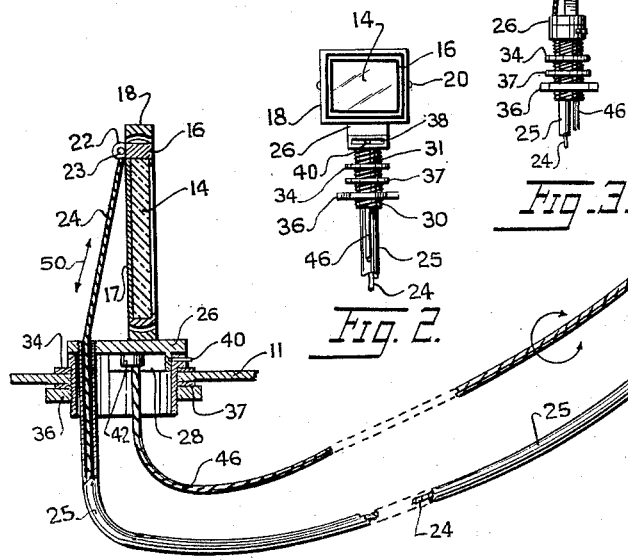
Fig. 2.
Fig. 3.
Fig. 5.
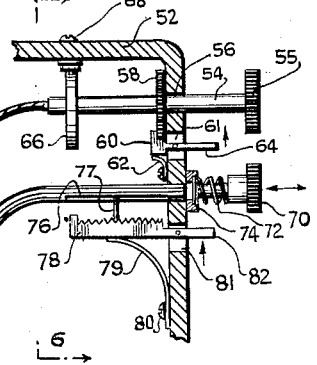
INVENTOR.
MORRIS COOPER
BY
ATTORNEY

2,903,944

REMOTE CONTROL REAR VIEW MIRROR

Morris Cooper, Croton-on-Hudson, N.Y.

Application January 31, 1958, Serial No. 712,392

8 Claims. (Cl. 88—93)

This invention concerns a remote controlled mirror for a vehicle.

The invention is particularly directed at a mirror which can be mounted on a fender of a vehicle such as an automobile and which will be remotely controlled from the driver's position by controls located at the dashboard.

A principal object of the invention is to provide a mirror of the character described provided with means for rotating or pivoting the mirror on a vertical axis and means for independently tilting the mirror on a horizontal axis.

A further object is to provide a means for adjusting a substantially plane mirror to selected positions on vertical and horizontal axes, with the adjustments being made against spring tension, so that upon actuating of individual release members, the mirror returns to a neutral position on vertical and horizontal axes of rotation respectively.

A still further object is to provide an adjustable mirror with flexible cable controls operated under spring tension to return to predetermined positions upon actuation of appropriate release members.

A further object is to provide an adjustable mirror which will retain a position to which it is set but which will return to an original position automatically upon actuation of a release member.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a portion of an automobile showing the mirror mounted on a fender of the automobile.

Fig. 2 is an elevational view of the mirror and support therefor.

Fig. 3 is a side elevational view of the mirror and support.

Fig. 4 is a top plan view of the mirror and support.

Fig. 5 is a longitudinal sectional view of the mirror, support and controls at the dashboard of the vehicle.

Fig. 6 is an elevational sectional view of the portions of the controls taken on lines 6—6 of Fig. 5.

Fig. 7 is a sectional view of a portion of the mirror support.

Fig. 8 is a bottom plan view taken on lines 8—8 of Fig. 7.

Referring to the drawings, there is shown an automobile 10 having a forwardly located fender 11 on which is mounted the mirror and support therefor generally indicated as 12. The device includes a substantially plane mirror 14 secured in a rectangular, circular or oval frame 16. The mirror is preferably made of transparent glass or plastic material with a metalized backing 17. The frame 16 is mounted in an outer frame 18 provided with pins 20 so that the mirror is pivotable on a horizontal axis.

Integrally formed with or attached to frame 16 is a pair of ears 22 having a pintle 23 to which is secured the end of a flexible cable 24. The cable is enclosed in a casing or tube 25. One end of the casing is threaded in an aperture 27 in a generally flat circular plate 26. Frame 18 is secured perpendicularly to plate 26 to maintain a vertical position thereon. Plate 26 has a depending semicylindrical flange 28. Plate 26 rests and rotates angularly on a cylindrical sleeve member 30. This member has an outer threaded wall 31 adapted to pass through a suitably located hole in fender 11. The sleeve has a shoulder 32 formed in its threaded side which seats on a washer 34. A nut 36 is threaded on sleeve 30 and a further washer 37 is provided to abut the underside of the fender so that the sleeve is securely affixed to the fender by tightening the nut on the sleeve. Sleeve 30 is provided with an arcuate slot 38 through which is inserted a pin 40. The pin is threaded in flange 28 and serves to retain the plate 26 on the sleeve as well as to guide it in angular motion. The length of the slot limits the travel of the pin and angular movement of the plate 26 and consequent angular turning of the mirror on a vertical axis.

Secured to the underside of plate 26 or integrally formed thereon is a collar 42 in which is secured by a screw 44 one end of another flexible cable 46. When cable 46 is turned, the plate 26 and mirror turn on a vertical axis. When cable 24 is pulled downwardly or pushed upwardly as indicated by arrow 50 in Fig. 5, the mirror tilts. The mirror is shown in Fig. 1 tilted in one position on a horizontal axis by a downward pull on cable 24. The cable is sufficiently stiff in the region between plate 26 and ears 22 so that when the cable is pushed upwardly through casing 25 the mirror 14 will tilt in a downward or clockwise direction. Pulling the cable, of course, causes the mirror to tilt counterclockwise on pins 20 when viewed from the side shown in Figs. 1, 3 and 5.

In Figs. 5 and 6 are shown the controls for positioning the mirror. On the dashboard panel 52 is mounted a shaft 54 which terminates in a knob 55. The shaft passes through a hole 56 in the vertical wall of the panel. The shaft is rotatably mounted in this hole and carries a toothed wheel 58. A blade 60 is pivotally mounted in a slot 61 in the panel. The blade is biased by a leaf spring 62 into engagement with the teeth of wheel 58. The blade has a lever or handle 64 projecting from the panel so that the blade can be tilted out of engagement with wheel 58. A coil spring 66 has one end secured on shaft 54 and the other end secured by screw 68 to the top of panel 52. Cable 46 terminates at and is secured to shaft 54. When the shaft is turned to any position, blade 60 holds the shaft in the set position against the tension in spring 66. When the shaft is turned the cable twists and turns the plate 26 and mirror 14. When the lever 64 is actuated to release wheel 58, the spring 66 automatically returns the mirror to the original neutral position.

Casing 25 terminates at and is secured in panel 52. Cable 24 extends through the casing and terminates in a knob 70 normally spaced from the panel by a coil spring 72 secured in an apertured cup 74. The cable can be extended or retracted with respect to panel 52 by pulling or pushing the knob 70. In either direction of motion, the knob will be moved against tension in spring 72 from the neutral untensioned position shown in Fig. 5. The terminal portion of casing 25 near panel 52 has a slot 76. A pin 77 which is secured to cable 24 passes through slot 76 and is engaged in the teeth of a bar 78. This bar is biased upwardly by a leaf spring 79 secured by a screw 80 to panel 52. The bar has a handle 82 extending through a slot 81 in the panel. The bar is pivotally mounted in this slot. The cable 24 will remain in any position set by actuation of knob 70 because of the engagement of the pin in the teeth of bar 78. Since the movement of the cable 24 is against tension in spring 72, disengagement of the pin and bar by actuation of handle 82 will permit the spring 72 to return the cable to the neutral position. Pulling or pushing the knob causes a corresponding tilt of mirror 14.

By appropriate actuation of knobs 55 and 70 the mirror can be positioned on vertical and horizontal axes for optimum viewing by the driver of the vehicle 10. Operation of the release members 64 or 82 independently returns the mirror to the neutral position on the vertical and horizontal axes respectively.

There has been thus provided, according to the invention, means for positioning the mirror by remote control, with any set position being held until one or both release members are actuated to return the mirror automatically to the original neutral position.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An optical device, comprising a first support, a mirror mounted on said support for pivoting on a horizontal axis, a second support adapted to be secured in a hole in a fender of a vehicle, said first support being mounted on said second support for rotation on a vertical axis, a first cable secured to the mirror and extending through the first and second supports, said cable terminated at a remote location, said cable being spring biased at said remote location so that the cable can be extended and retracted against spring tension to tilt the mirror on said horizontal axis, a second cable secured to said first support and extending through said second support, said second cable terminating at said remote location, said second cable being spring biased so that the second cable can be rotated against spring tension to rotate the mirror on said vertical axis, means holding the cables in selected positions of extension and rotation respectively, and means for releasing the holding means for automatically returning the cables to neutral positions, said holding means comprising toothed wheel and bar members, the releasing means being manually actuatable handles pivotally mounted at said remote location.

2. A remote controlled rear view device for a vehicle having a fender and a dashboard, comprising a substantially plane mirror, a frame supporting said mirror, a support, said frame being pivotally mounted on the support to turn the mirror on a horizontal axis, a plate secured to the support, means supporting said plate, so that the plate turns on a vertical axis, a first flexible cable secured at one end to said frame for pivoting the mirror on said horizontal axis, a tube enclosing said cable, said tube having one end secured to said frame with the other end thereof being attached to the dashboard of the vehicle, a pin secured to the cable and extending through the tube at the dashboard, a toothed bar pivotally mounted on the dashboard and engaged by said pin, said bar being urged by spring means against the pin, said cable having the other end thereof extending through the dashboard for extension and retraction against a spring tension thereat, a second cable secured to said plate for turning the mirror on a vertical axis, said second cable terminating at a cylindrical shaft, said shaft extending through said dashboard for rotation thereat against a further spring tension, a toothed wheel mounted on said shaft, and a blade pivotally carried on said dashboard and urged by spring means into contact with said toothed wheel, said blade and bar being provided with handles extending out of the dashboard for pivotal movement of the blade and bar out of contact with the toothed wheel and pin respectively.

3. A remote controlled rear view device for a vehicle comprising a substantially plane mirror, a frame supporting said mirror, a support, said frame being pivotally mounted on the support to turn the mirror on a horizontal axis, a plate secured to the support, means supporting said plate so that the plate turns on a vertical axis, a first flexible cable secured at one end to said frame for pivoting the frame on said horizontal axis, a tube enclosing said cable, said tube having a slot at a remote end thereof, said end being attached to the dashboard of the vehicle, a pin secured to the cable and extending through the slot at the dashboard, a toothed bar pivotally mounted on the dashboard and engaged by said pin, said bar being urged by spring means against the pin, said cable having the other end thereof extending through the dashboard for extension and retraction against a spring tension thereat, a spring secured to the other end of the cable at the dashboard for providing said spring tension, a second cable secured to said plate for turning the mirror on a vertical axis, said second cable terminating at a cyclindrical shaft, said shaft extending through said dashboard for rotation thereat against a further spring tension, a coil spring engaged between said shaft and dashboard and providing said further spring tension, a toothed wheel mounted on said shaft, and a blade pivotally carried on said dashboard and urged by spring means into contact with said toothed wheel, said blade and bar being provided with handles extending out of the dashboard for pivotal movement of the blade and bar out of contact with the toothed wheel and pin respectively.

4. A remote controlled rear view device for a vehicle comprising a substantially plane mirror, a frame peripherally surrounding said mirror, a vertical support, said frame being pivotally mounted on the support to turn the mirror on a horizontal axis, a plate secured to the support, a sleeve supporting said plate, so that the plate turns on a vertical axis on the sleeve, said sleeve having means for attachment to a fender of an automobile, a first flexible cable secured at one end to said first frame for pivoting the mirror on said horizontal axis, a tube enclosing said cable, said tube having a slot at a remote end thereof, said end being attached to the dashboard of the vehicle, a pin secured to the cable and extending through the tube at the dashboard, a toothed bar pivotally mounted on the dashboard and engaged by said pin, said bar being urged by spring means against the pin, said cable having the other end thereof extending through the dashboard for extension and retraction against a spring tension thereat, a second cable secured to said plate for turning the mirror on a vertical axis, said other cable being secured to a cylindrical shaft, said shaft extending through said dashboard for rotation thereat against a further spring tension, a toothed wheel mounted on said shaft, and a blade pivotally carried on said dashboard and urged by spring means into contact with said toothed wheel.

5. A remote controlled rear view device for a vehicle comprising a substantially plane mirror, a frame peripherally surrounding said mirror, a vertical support, said frame being pivotally mounted on the support to turn the mirror on a horizontal axis, a plate secured to the support, a sleeve supporting said plate, so that the plate turns on a vertical axis on the sleeve, said sleeve having means for attachment to a fender of an automobile, a first flexible cable secured at one end to said first frame for pivoting the mirror on said horizontal axis, a tube enclosing said cable, said tube having a slot at a remote end thereof, said end being attached to the dashboard of the vehicle, a pin secured to the cable and extending through the tube at the dashboard, a toothed bar pivotally mounted on the dashboard and engaged by said pin, said bar being urged by spring means against the pin, said cable having the other end thereof extending through the dashboard for extension and retraction against a spring tension thereat, a second cable secured to said plate for turning the mirror on a vertical axis, said other cable being secured to a cylindrical shaft, said shaft extending through said dashboard for rotation thereat against a further spring tension, a toothed wheel mounted on said shaft, and a blade pivotally carried on said dashboard and urged by spring means into contact with said toothed wheel, said blade and bar being provided with handles extending out of the dashboard for pivotal movement of the blade and bar out of contact with the toothed wheel and pin respectively.

6. A remote controlled rear view device for a vehicle having a fender and dashboard, comprising a substantially plane mirror, a first frame peripherally surrounding said mirror, a second frame peripherally surrounding the first frame, said frame being pivotally mounted on the second frame to turn the mirror on a horizontal axis parallel to one side of the second frame, a plate secured to the second frame, a sleeve supporting said plate, so that the plate turns on a vertical axis on the sleeve, said sleeve having means for attachment to the fender, a first flexible cable secured at one end to said first frame for pivoting the frame on said horizontal axis, a tube enclosing said cable, said tube having a slot at a remote end thereof, said end being attached to the dashboard of the vehicle, a pin secured to the cable and extending through the slot in the tube at the dashboard, a toothed bar pivotally mounted on the dashboard and engaged by said pin, said bar being urged by spring means against the pin, said cable having the other end thereof extending through the dashboard for extension and retraction against a spring tension thereat, a second cable secured to said plate and terminating at a cylindrical shaft, said shaft extending through said dashboard for rotation thereat against a further spring tension, a toothed wheel mounted on said shaft, and a blade pivotally carried on said dashboard and urged by spring means into contact with said toothed wheel.

7. A remote controlled rear view device for a vehicle having a fender and dashboard, comprising a substantially plane mirror, a first frame peripherally surrounding said mirror, a second frame peripherally surrounding the first frame, said frame being pivotally mounted on the second frame to turn the mirror on a horizontal axis parallel to one side of the second frame, a plate secured to said one side of the second frame, a sleeve supporting said plate, so that the plate turns on a vertical axis on the sleeve, said sleeve having means for attachment to the fender, a first flexible cable secured at one end to said first frame for pivoting the frame on said horizontal axis, a tube enclosing said cable, said tube having a slot at a remote end thereof, said end being attached to the dashboard of the vehicle, a pin secured to the cable and extending through the slot in the tube at the dashboard, a toothed bar pivotally mounted on the dashboard and engaged by said pin, said bar being urged by spring means against the pin, said cable having the other end thereof extending through the dashboard for extension and retraction against a spring tension thereat, a second cable secured to said plate and terminating at a cylindrical shaft, said shaft extending through said dashboard for rotation thereat against a further spring tension, a toothed wheel mounted on said shaft, and a blade pivotally carried on said dashboard and urged by spring means into contact with said toothed wheel, said blade and bar being provided with handles extending out of the dashboard for pivotal movement of the blade and bar out of contact with the toothed wheel and pin respectively.

8. A remote controlled rear view device for a vehicle, comprising a substantially plane mirror, a first frame peripherally surrounding said mirror, a second frame peripherally surrounding the first frame, said first frame being pivotally mounted on the second fame to turn the mirror on a horizontal axis parallel to one side of the second frame, a plate secured to said one side of the second frame, a sleeve supporting said plate, said plate having a depending flange disposed in said sleeve with a pin disposed therein and extending through a slot in the sleeve so that the plate turns on a vertical axis on the sleeve, said sleeve having means for attachment to fender of an automobile, a first flexible cable secured at one end to said first frame for pivoting the frame on said horizontal axis, a tube enclosing said cable, said tube having a slot at a remote end thereof, said end being attached to the dashboard of the vehicle, a pin secured to the cable and extending through the tube at the dashboard, a toothed bar pivotally mounted on the dashboard and engaged by said pin, said bar being urged by spring means against the pin, said cable having the other end thereof extending through the dashboard for extension and retraction against a spring tension, a spring secured to the other end of the cable at the dashboard for providing said spring tension, a second cable secured to said plate and terminating at a cylindrical shaft, said shaft extending through said dashboard for rotation thereat against a further spring tension, a coil spring engaged between said shaft and dashboard and providing said further spring tension, a toothed wheel mounted on said shaft, and a blade pivotally carried on said dashboard and urged by spring means into contact with said toothed wheel, said blade and bar being provided with handles extending out of the dashboard for pivotal movement of the blade and bar out of contact with the toothed wheel and pin respectively.

References Cited in the file of this patent

UNITED STATES PATENTS

| | | |
|---|---|---|
| 1,630,217 | Rasor | May 24, 1927 |
| 1,688,214 | Walden | Oct. 16, 1928 |
| 2,330,444 | Park | Sept. 28, 1943 |
| 2,472,438 | Price | June 7, 1949 |
| 2,573,127 | Von Bredow | Oct. 30, 1951 |
| 2,626,539 | Peterson | Jan. 27, 1953 |
| 2,632,363 | Persson | Mar. 24, 1953 |
| 2,696,142 | Langford | Dec. 7, 1954 |